United States Patent
Usui

(10) Patent No.: US 11,783,389 B2
(45) Date of Patent: Oct. 10, 2023

(54) METHODS AND SYSTEMS FOR PREDICTING A PRICE OF ANY SUBTRACTIVELY MANUFACTURED PART UTILIZING ARTIFICIAL INTELLIGENCE AT A COMPUTING DEVICE

(71) Applicant: Proto Labs, Inc., Maple Plain, MN (US)

(72) Inventor: Shuji Usui, Minneapolis, MN (US)

(73) Assignee: Proto Labs, Inc., Maple Plain, MN (US)

( * ) Notice: Subject to any disclaimer, the term of this patent is extended or adjusted under 35 U.S.C. 154(b) by 347 days.

(21) Appl. No.: 16/706,562

(22) Filed: Dec. 6, 2019

(65) Prior Publication Data
US 2021/0174408 A1 Jun. 10, 2021

(51) Int. Cl.
*G06Q 30/0283* (2023.01)
*G06N 20/00* (2019.01)
(Continued)

(52) U.S. Cl.
CPC ......... *G06Q 30/0283* (2013.01); *G06F 18/23* (2023.01); *G06N 20/00* (2019.01); *G06T 1/20* (2013.01); *G06V 10/762* (2022.01)

(58) Field of Classification Search
CPC .. G06Q 30/0283; G06N 20/00; G06K 9/6218; G06T 1/20
See application file for complete search history.

(56) References Cited

U.S. PATENT DOCUMENTS 6,836,699 B2    12/2004 Lukis et al.

7,305,367 B1 *  12/2007 Hollis ................ G06Q 30/0283
                                                    705/400
(Continued)

FOREIGN PATENT DOCUMENTS

WO     2001077781        7/2002
WO     WO-2015058152 A1 * 4/2015  ......... G06Q 30/0635

OTHER PUBLICATIONS

Pahwa et al. "Network Based Pricing for 3D Printing Services in Two-Sided Manufacturing-as-a-Service Marketplace", Machine Learning, Cornell University, Jul. 17, 2019. Retrieved on Jan. 14, 2021. Retrieved from <URL: https://arxiv.org/abs/1907.07673> entire document.

(Continued)

*Primary Examiner* — Dylan C White
(74) *Attorney, Agent, or Firm* — CALDWELL INTELLECTUAL PROPERTY LAW

(57) ABSTRACT

A method for predicting a price of any subtractively manufactured part utilizing artificial intelligence at a computing device. The method comprises receiving a manufacturing request datum, wherein the manufacturing request datum further comprises at least an element of user mechanical part data, selecting a correlated dataset containing a plurality of data entries. The method further comprises generating, at a clustering unsupervised machine-learning model, at least a first correlated compatible part element, receiving, at a supervised machine-learning model, a first training set, generating, at a supervised machine-learning model as a function of the first training set, an external price output, and determining a price ratio output, wherein determining the price ratio output further comprises generating a loss function of a part specific variable and minimizing the loss function.

20 Claims, 9 Drawing Sheets

(51) Int. Cl.
   *G06F 18/23*     (2023.01)
   *G06T 1/20*      (2006.01)
   *G06V 10/762*    (2022.01)

(56) References Cited

U.S. PATENT DOCUMENTS

| | | | |
|---|---|---|---|
| 8,239,284 B2* | 8/2012 | Lukis | G06Q 30/00 |
| | | | 705/26.5 |
| 9,292,626 B2 | 3/2016 | Nelaturi et al. | |
| 9,697,554 B2 | 7/2017 | Herrman et al. | |
| 10,373,183 B1 | 8/2019 | Jacobs, II et al. | |
| 11,392,857 B1* | 7/2022 | Dohrn | G06N 20/00 |
| 11,429,070 B2* | 8/2022 | Leng | G06F 17/16 |
| 11,449,793 B2* | 9/2022 | Neumann | G16H 50/70 |
| 11,535,954 B2* | 12/2022 | Czinner | C08L 97/02 |
| 2009/0125418 A1 | 5/2009 | Lukis et al. | |
| 2014/0067479 A1 | 3/2014 | Stacklin et al. | |
| 2015/0127480 A1* | 5/2015 | Herrman | G06Q 30/0283 |
| | | | 705/26.4 |
| 2017/0032283 A1 | 2/2017 | Kamiya | |
| 2017/0323319 A1* | 11/2017 | Rattner | G06N 20/00 |
| 2019/0339688 A1* | 11/2019 | Cella | G05B 19/41865 |
| 2022/0138619 A1* | 5/2022 | Neumann | G06F 3/0482 |
| | | | 706/12 |
| 2023/0042464 A1* | 2/2023 | Atev | G06N 20/00 |

OTHER PUBLICATIONS

PCT/US2020/061764; International Search Report; dated Feb. 9, 2021; Authorized Officer: Blaine R. Copenheaver.
Alkaios Bournias Varotsis, CNC Machining Is More Accessible Than You May Think, Article, Sep. 5, 2018, https://www.manufacturing.net/article/2018/09/cnc-machining-more-accessible-you-may-think.

* cited by examiner

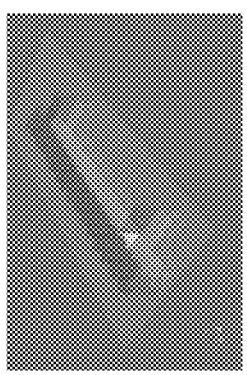
FIG. 7A
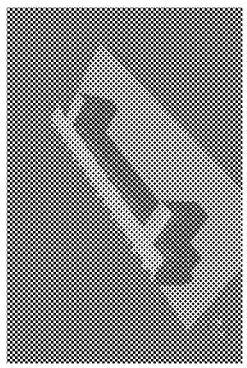
FIG. 7B
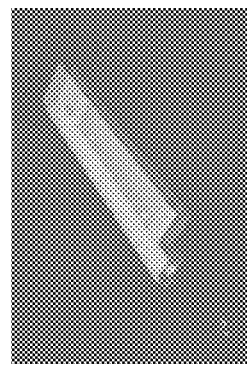
FIG. 7C
FIG. 7D
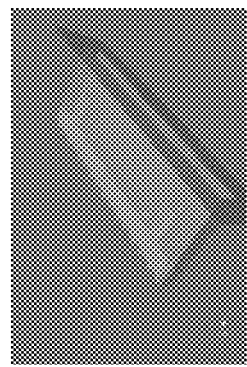
FIG. 7E
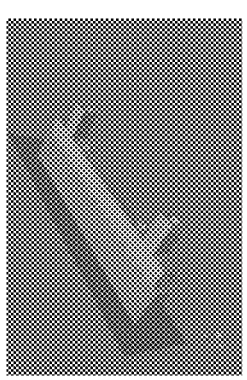
FIG. 7F

METHODS AND SYSTEMS FOR PREDICTING A PRICE OF ANY SUBTRACTIVELY MANUFACTURED PART UTILIZING ARTIFICIAL INTELLIGENCE AT A COMPUTING DEVICE

FIELD OF THE INVENTION

The present invention generally relates to the field of computer-aided design and structure fabrication. In particular, the present invention is directed to methods and systems for predicting a price of any subtractively manufactured part utilizing artificial intelligence at a computing device.

BACKGROUND

Technical specifications and computer-aided drawings typically convey a variety of information about a to-be-fabricated structure, such as a part or an assembly of components of a mechanical part. Examples of such information includes information about geometry, materials, finishes, connections, hardware, special processes, dimensions, tolerances, and the like as known in the art. The wide array of information about a to-be-fabricated structure within the technical specification and/or computer-aided drawings can lead to challenges when determining a market price for the structure, such as an inability to properly predict tool path, milling time, tooling setup time, material cost, removed volume and/or area, and the like.

Inability to obtain data for the vast collection of possible to-be fabricated structures have driven manufacturing costs to be analyzed in view of only part size, which causes several problems and disadvantages. Utilizing only part size creates a scope so limited as to neglect other key variables affecting the cost of manufacturing. For instance, the time it takes to mill a part is dependent on the features in the parts, such as pocket, hole, boss, grooving, channel, and the material inevitably affecting the cost to fabricate, such as aluminum is relatively soft and as a result quicker to mill therefore less expensive to use as a material of manufacture. Thus, it is extremely challenging to maintain a level of consistency when pricing mechanical parts for manufacture.

SUMMARY OF THE DISCLOSURE

In an aspect a method for predicting a price of any subtractively manufactured part utilizing artificial intelligence at a computing device. The method of predicting a price comprises receiving a manufacturing request datum, wherein the manufacturing request datum further comprises at least an element of user mechanical part data. The method further comprises selecting a correlated dataset containing a plurality of data entries, wherein each dataset contains at least a datum of mechanical part data and at least a first correlated compatible part element as a function of the manufacturing request datum. The method further comprises generating, at a clustering unsupervised machine-learning model, at least a second correlated compatible part element as a function of the manufacturing request datum and the correlated dataset. The method further comprises receiving, at a supervised machine-learning model, a first training set as a function of the at least an element of user mechanical part data and the at least a second correlated compatible part element. The method further comprises generating, at a supervised machine-learning model as a function of the first training set, an external price output as a function of relating the manufacturing request datum to at least a part element.

The method further comprises determining a price ratio output, as a function of the external price output, wherein determining the price ratio output further comprises generating a loss function of a part specific variable and minimizing the loss function.

In another aspect a system for predicting a price of any subtractively manufactured part utilizing artificial intelligence at a computer device. The system of predicting a price is designed and configured to receive a manufacturing request datum, wherein the manufacturing request datum further comprises at least an element of user mechanical part data. The system is further designed and configured to select a correlated dataset containing a plurality of data entries wherein each dataset contains at least a datum of mechanical part data and at least a first correlated compatible part element as a function of the at least a manufacturing request datum. The system is further designed and configured to generate, at a clustering unsupervised machine-learning model, at least a compatible part element as a function of the manufacturing request datum and the correlated dataset. The system is further designed and configured to receive, at a supervised machine-learning model, a first training set as a function of the at least an element of user mechanical part data and the at least a second correlated compatible part element. The system is further designed and configured to generate, at a supervised machine-learning model, an external price output as a function of relating the manufacturing request datum to at least a part element. The system is further designed and configured to determine a price ratio output, wherein determining the price ratio output further comprises generating a loss function of a part specific variable and minimizing the loss function.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7A-F are computer renderings of an embodiment of the z-buffers for the surfaces of a mechanical part contained within manufacturing request datum;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for predicting a price of any subtractively manufactured part utilizing artificial intelligence at a computing device. Embodiments of the systems and methods herein describe a means for predicting a price ratio of any CNC mechanical part utilizing artificial intelligence by a novel process which generates an external price output as a function of relating the manufacturing request datum to at least a part element and determines a price ratio as a function of the external price output. In an embodiment, the price ratio is determined by receiving a manufacturing request datum, which further comprises at least an element of user mechanical part data, selecting a correlated dataset containing a plurality of data entries, generating at least a first correlated compatible part element at a clustering unsupervised machine-learning model, receiving a first training set, and by generating an external price output at a supervised machine-learning model.

Figure 1:
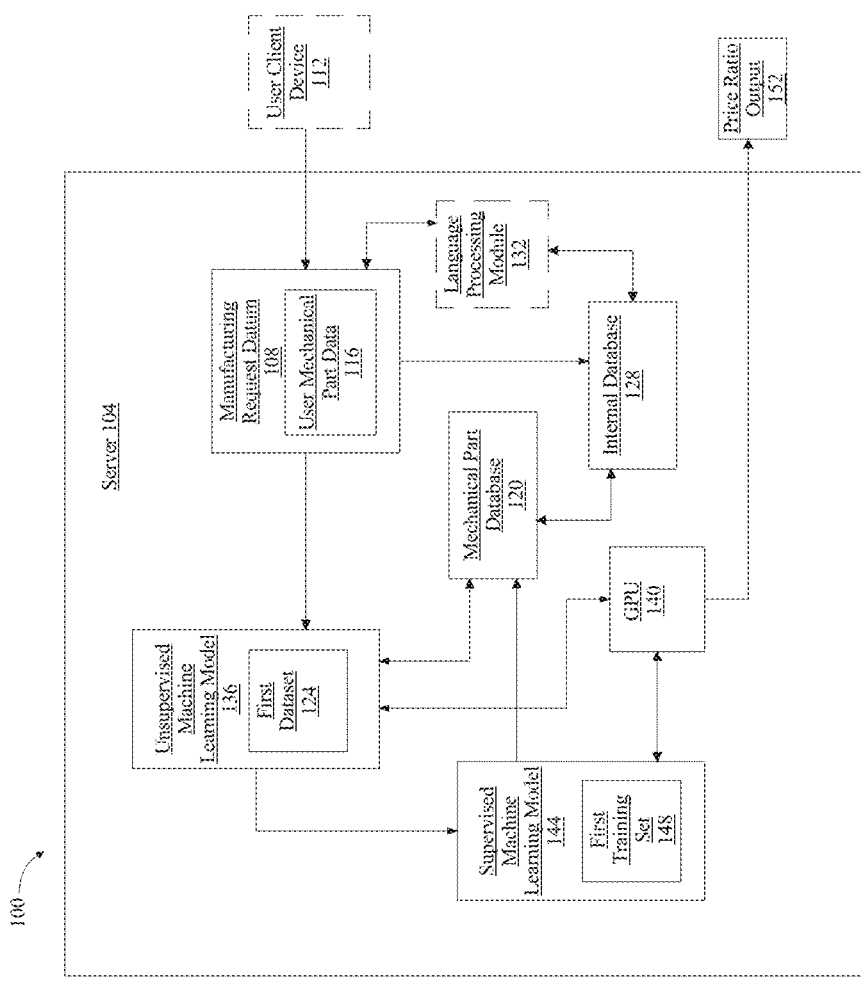
FIG. 1 is a high-level block diagram illustrating an embodiment of a system for predicting a price of any subtractively manufactured part utilizing artificial intelligence at a computer device.

Referring now to FIG. 1, a block diagram of system 100 for predicting a price of a CNC mechanical part using artificial intelligence is presented. System 100 is configured to determine a price ratio as a function of the external price output and can include server 104, manufacturing request datum 108, user mechanical part data 116, user client device 112, unsupervised machine-learning model 136, first dataset 124, mechanical part database 120, internal database 128, graphics processing unit (GPU) 140, supervised machine-learning model 144, first training set 148, external price output 500, and any combination thereof.

Still referring to FIG. 1, system 100 is configured to include server 104. server 104 may include any computing device as described herein, including without limitation a microcontroller, microprocessor, digital signal processor (DSP) and/or system on a chip (SoC) as described herein. Server 104 may be housed with, may be incorporated in, or may incorporate one or more sensors of at least a sensor. Computing device may include, be included in, and/or communicate with a mobile device such as a mobile telephone or smartphone. Server 104 may include a single computing device operating independently, or may include two or more computing device operating in concert, in parallel, sequentially or the like; two or more computing devices may be included together in a single computing device or in two or more computing devices. Server 104 with one or more additional devices as described below in further detail via a network interface device. Network interface device may be utilized for connecting a server 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Server 104 may include but is not limited to, for example, a server 104 or cluster of computing devices in a first location and a second computing device or cluster of computing devices in a second location. Server 104 may include one or more computing devices dedicated to data storage, security, distribution of traffic for load balancing, and the like. Server 104 may distribute one or more computing tasks as described below across a plurality of computing devices of computing device, which may operate in parallel, in series, redundantly, or in any other manner used for distribution of tasks or memory between computing devices. Server 104 may be implemented using a "shared nothing" architecture in which data is cached at the worker, in an embodiment, this may enable scalability of system 100 and/or computing device.

With continued reference to FIG. 1, system 100 is configured to receive a manufacturing request datum 108 from a user client device 112. The manufacturing request datum 108 further comprises at least an element of user mechanical part data. Manufacturing request datum 108, as used herein, includes any data describing and/or relating to a request for manufacture of at least a CNC mechanical part. Request for manufacture, as used herein, includes a buyer inviting the supplier to submit a bid on the buyer's specific manufacturing inquiry. A bid, as described herein, includes an estimated cost to manufacture the buyer's desired manufacturing inquiry. A request for manufacture may include, without limitation, a price quote, a price request, a quote request, a pricing enquiry, price prediction, and the like. A request for manufacture may further include, without limitation, a computer model of a subtractively manufactured part. A computer model, as described herein, is a digital model of a physical structure as created using computer-aided design (CAD) modeling software. For example and without limitation, computer-aided design (CAD) software may include SOLIDWORKS® software and/or CATIA software (available from Dassault Systèmes SolidWorks Corp, Waltham, Mass.), AUTOCAD® software and/or Fusion 360 software (available from Autodesk, Inc., San Rafael, Calif.), PTC Creo software (available from PTC, Inc., Boston, Mass.), Siemens NX software (available from Siemens PLM Software, Plano, Tex.) and MICROSTATION® software (available from Bentley Systems, Inc., Exton, Pa.), and the like. The computer model may include any modeling type, such as, without limitation, a wireframe, solid model and/or any combination thereof. The computer model may be saved in a computer file using any suitable file protocol, such as, without limitation, SolidWorks part file (.SLDPRT), several SolidWorks part files organized into a single assembly (.SLDASM), 3D assembly file supported by various mechanical design programs (.STP), graphics file saved in a 2D/3D vector format based on the Initial Graphics Exchange Specification (.IGS) and/or the like. The computer model further includes information about the geometry and/or other defining properties of the mechanical part's structure.

Continuing to refer to FIG. 1, manufacturing request datum 108 includes at least an element of user mechanical part data 116. User mechanical part data 116, as used herein, includes any descriptive attributes of the manufacturing request datum 109. Descriptive attributes, as used herein, are any features, limitations, details, restrictions and/or specifications of the manufacturing request datum 108. Descriptive attributes may include, without limitation, any features, limitations, details, restrictions and/or specifications relating to the CNC mechanical part geometry, materials, finishes, connections, hardware, special processes, dimensions, tolerances, and the like. Descriptive attributes may further include, without limitation, any features, limitations, details, restrictions, and/or specifications relating to the total request for manufacture, such as total amount of CNC mechanical parts, restrictions on deadline to have request completed, and the like. As an example and without limitation, user mechanical part data 116 may include part count data that contains the total number of each CNC mechanical part included in the manufacturing request datum 108, such as a request to have a total number of 24 brackets manufactured. As a further example and without limitation, user mechanical part data 116 may include part face count data that contains the total number of faces on the CNC mechanical part included in the manufacturing request datum 108, such as a price request to have a hollow box with a total of 10 faces manufactured. As another example and without limitation, user mechanical part data 116 may include part material data that contains the material to which the user desired to have the CNC mechanical part of the manufacturing request datum 108 manufactured, such as a quote request for a titanium roller bushing. Persons skilled in the art, upon reviewing the entirety of this disclosure, will be aware of various descriptive attributes which may be suitable for use user mechanical part data consistently with this disclosure.

With continued reference to FIG. 1, a user client device 112 may include, without limitation, a transmission of communication with at least a server 104; transmission may include any transmission as described herein. A user client device 112 may include an additional computing device, such as a mobile device, laptop, desktop computer, or the like; as a non-limiting example, the user client device 112 may be a computer and/or workstation operated by an engineering professional. Persons skilled in the art, upon reviewing the entirety of this disclosure, will be aware of various devices which may be suitable for use as user client device consistently with this disclosure.

Still referring to FIG. 1, server 104 is configured to select at least a correlated dataset containing a plurality of data entries wherein each dataset contains at least a datum of mechanical part data and at least a first correlated compatible part element as a function of the at least a manufacturing request datum 108. Mechanical part data, as used herein, includes any of the data suitable for use as user mechanical part data 116, as described above. Datasets may be selected and contained within mechanical part database 120 as described below in more detail in reference to FIG. 2.

With continued reference to FIG. 1, each dataset contains at least a datum of body data and at least a first correlated compatible part element. Correlated compatible part element, as used herein, includes any element of data identifying and/or describing any characteristic of a CNC mechanical part that may affect, modify and/or have an influence on the manufacturing process as a function of the manufacturing request datum 108. Characteristics of a CNC mechanical part that may affect, modify and/or have an influence on the manufacturing process, as used herein, include any detail of the manufacturing request datum 108 that may impact limitations of the manufacturing process, such as milling time, milling cost, tool path and/or tool selection. Correlated compatible part element may include for example a particular characteristic such as, one horizontal hole included in the mechanical part, three hollow openings included in the mechanical part, and 12 cooling fins included in the CNC mechanical part. Characteristics may include a category of CNC mechanical part characteristics that may be categorized as having a shared attribute or trait. For example and without limitation, characteristics may include categories such as including horizontal holes, including vertical holes, similar traits of manufacturing materials, such as fracture toughness, flexibility, conductivity, corrosion resistance, and the like, including gear features, including threading, diameter, length, design for manufacturability, volume, and the like. In an embodiment, at least a datum of mechanical part data is correlated with a compatible part element where the element of mechanical part data is located in the same data element and/or portion of data element as the mechanical part data. For example and without limitation, and element of mechanical part data is correlated with a compatible part element where both element of mechanical part data and compatible part element are contained within the same first dataset 124. For instance and without limitation, mechanical part data showing a request for a quantity of 10,000 parts may be correlated to a compatible part element such as a mechanical part machines by limited tool sets which is shown to improve scalability by decreasing the amount of times the machine would be required to change tools. In another example and without limitation, mechanical part data showing a desire for a cooling fin may be correlated to a compatible part element such as aluminum which is thermal conductor, absorbing heat quickly, and a common material for cooling fins because of this attribute. In yet another non-limiting example, mechanical part data showing a need to withstand a load above a certain threshold may be correlated to a compatible part element such as titanium which is recognized for its high strength-to-weight ratio.

With continued reference to FIG. 1, dataset containing plurality of data entries wherein each dataset contains at least a datum of mechanical part data and a first correlated compatible part element may be stored in mechanical part database 120 as described in more detail below in reference to FIG. 2. Mechanical part database 120 may be implemented, without limitation, as a relational database, a key-value retrieval datastore such as a NOSQL database, or any other format or structure for use as a datastore that a person skilled in the art would recognize as suitable upon review of the entirety of this disclosure. Dataset may be stored in any suitable data and/or data type. For instance and without limitation, dataset may include textual data, such as numerical, character, and/or string data. Textual data may include a standardized name and/or code for in-process and/or post-processing manufacturing, or the like; codes may include raw material codes, dimensional codes, calibration codes, mechanical and/or thermal testing codes, safety codes, and/or data formatting codes, which may include without limitation codes used in CAD 3D geometry, assembly and PMI standards such as STEP AP242 and ASME Y14.5 geometric dimensioning and tolerancing (GD&T) symbols. In general, there is no limitation on forms textual data or non-textual data used as dataset may take; persons skilled in the art, upon reviewing the entirety of this disclosure, will be aware of various forms which may be suitable for use as dataset consistently with this disclosure.

Still referring to FIG. 1, dataset may be stores as image data, such as for example an image of a particular CNC mechanical part, such as a computer model of a threaded bolt, a computer-aided design of a stainless-steel endcap, or a tool path of a hollow box. Image data may be stored in various forms including for example, joint photographic experts group (JPEG), exchangeable image file format (Exif), tagged image file format (TIFF), graphics interchange format (GIF), portable network graphics (PNG), netpbm format, portable bitmap (PBM), portable any map (PNM), high efficiency image file format (HEIF), still picture interchange file format (SPIFF), better portable graphics (BPG), drawn filed, enhanced compression wavelet (ECW), flexible image transport system (FITS), free lossless image format (FLIF), graphics environment manage (GEM), portable arbitrary map (PAM), personal computer exchange (PCX), progressive graphics file (PGF), gerber formats, 2 dimensional vector formats, 3 dimensional vector formats, compound formats including both pixel and vector data such as encapsulated postscript (EPS), portable document format (PDF), SolidWorks part file (.SLDPRT), several SolidWorks part files organized into a single assembly (.SLDASM), 3D assembly file supported by various mechanical design programs (.STP), graphics file saved in a 2D/3D vector format based on the Initial Graphics Exchange Specification (.IGS) and stereo formats.

Continuing to refer to FIG. 1, datasets contained within mechanical part database 120 may be obtained from an internal database. Internal database 128 may be implemented, without limitation, as a relational database, a key-value retrieval datastore such as a NOSQL database, or any other format or structure for use as a datastore that a person skilled in the art would recognize as suitable upon review of the entirety of this disclosure. Internal database 128 may include data entries reflecting one or more request for manufacture. The request for manufacture may include any request for manufacture as described above. Request for manufacture may include requests submitted according to any process, including without limitation by using user client device 112. User client device may include any user client device as described above. System 100 is further configured to store manufacturing request datum 108 in internal database 128.

With continued reference to FIG. 1, data information describing significant categories and/or features of mechanical part data and/or relationships of such categories to compatible part element may be extracted from one or more documents using a language processing module 132. Language processing module 132 may include any hardware and/or software module, such as a processor, memory, field-programmable gate array (FPGA), microprocessor, controller, microcontroller, graphics processing unit, central processing unit, and the like. Language processing module 132 may be configured to extract from the one or more documents, one or more words. One or words may include, without limitation, strings of one or characters, including without limitation any sequence or sequences of letters, numbers, punctuation, diacritic marks, engineering symbols, geometric dimensioning and tolerancing (GD&T) symbols, formulas American Society for Testing and Materials (ASTM) Standards, such as technical standards for materials, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module 132 may compare extracted words to categories of mechanical part data recorded by the server 104, and/or one or more categories of compatible part elements recorded by the server 104; such data for comparison may be entered on the server 104 using manufacturing request datum and the like. In an embodiment, one or more categories may be enumerated, to find total count of mentions in such documents. Alternatively or additionally, language processing module 132 may operate to produce a language processing model. Language processing model may include a program generated the server 104 and/or language processing module 132 to produce associations between one or more words extracted from at least a document and detect associations, including without limitation mathematical associations, between such words, and/or associations of extracted words with categories of user input datums, relationships of such categories to first probing elements, and/or categories of first probing elements. Associations between language elements, where language elements include for purposes herein extracted words, categories of user input datums, relationships of such categories to first probing elements, and/or categories of first probing elements may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of user input datum, a given relationship of such categories to a first probing element, and/or a given category of a first probing element. As a further example, statistical correlations and/or mathematical associations may include probabilistic formulas or relationships indicating a positive and/or negative association between at least an extracted word and/or a given category of mechanical part data, a given relationship of such categories to compatible part element, and/or a given category of compatible part element; positive or negative indication may include an indication that a given document is or is not indicating a category of mechanical part data, relationship of such category to a first compatible part element, and/or category of compatible part element is or is not significant. For instance and without limitation, a negative indication may be determined from a phrase such as, "A high melting point was not found to be compatible with aluminum alloys" whereas a positive indication may be determined from a phrase such as, "A mechanical part with varying diameter vertical holes was found to be compatible with multiple drill bits." A phrase, sentence, word, or other textual element in a document or corpus of documents constituting a positive or negative indicator may be determined, in an embodiment, by mathematical associations between detected words, comparisons to phrases and/or words indicating positive and/or negative indicators, are stored in memory by the server 104, or the like.

Continuing to refer to FIG. 1, language processing module 132 and/or server 104 may generate the language processing model by any suitable method, including without limitation, a speech recognition algorithm. The language processing model may include an automatic speech to text model to enable the recognition and/or translation of spoken language into text. The automatic speech to text model may include acoustic modeling and/or language modeling. The automatic speech to text model may include, as an example and without limitation, a Hidden Markov Model (HMM). HMMs, as used herein, are statistical models with inference algorithms that that may be applied to the models, as described in further detail below. As an example and without limitation, the automatic speech to text model may include dynamic time warping (DTW)-based speech recognitional. Dynamic time warping, as used herein, is an algorithm for measuring similarity between two sequences that may vary in speed. As a further example and without limitation, the automatic speech to text model may include neural networks, wherein a neural network is designed to recognize patterns by utilizing thousands and/or millions of simple processing nodes that are densely interconnected. Neural networks may be used in the speech recognition algorithm for multiple aspects of speech recognitional such as phoneme classification, isolated work recognition, audiovisual speech recognition, audiovisual speaker recognition, speaker adaptation, and the like. The automatic speech to text model may further be configured to include, as a non-limiting example, end-to-end automatic speech recognition. End-to end automatic speech recognition, as described herein, is a system that directly maps input audio sequence to sequence of words or other graphemes, such as directly learning to map speech acoustics to different language characters.

Still referring to FIG. 1, language processing module 132 and/or server 104 may further generate the language processing model, without limitation, utilizing a natural language processing classification algorithm. The language processing model may include a natural language process classification model that enumerates and/or derives statistical relationships between input term and output terms. An algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted word category of mechanical part, a given relationship of such categories to compatible part elements, and/or a given category of compatible part elements. There may be a finite number of category of mechanical part data a given relationship of such categories to a compatible part element, and/or a given category of part elements to which an extracted word may pertain. An HMM inference algorithm, such as the forward-backward algorithm or the Viterbi algorithm, may be used to estimate the most likely discrete state given a word or sequence of words. Language processing module 132 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating a language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module 132 may parse the manufacturing request datum 108 for the element of user mechanical part data and match the element of user mechanical part data to a correlated dataset containing at least an element of the mechanical part data. In an embodiment, datasets contained within mechanical part database may be categorized by CNC mechanical part characteristics, as described in more detail below in reference to FIG. 2. Language processing module 132 may match at least a dataset by extracting one or more keywords containing words, phrases, test results, numerical scores, and the like from manufacturing request datum 108 and analyze the one or more keywords, as described in more detail below. Language processing module 132 may be configured to normalize one or more words or phrases of user input, where normalization signifies a process whereby one or more words or phrases are modified to match corrected or canonical forms. For instance, misspelled words may be modified to correctly spelled versions, words with alternative spellings may be converted to spellings adhering to a selected standard, such as American or British spellings, capitalizations and apostrophes may be corrected, and the like; this may be performed by reference to one or more "dictionary" data structures listing correct spellings and/or common misspellings and/or alternative spellings, or the like.

With continued reference to FIG. 1, language processing module 132 may extract and/or analyze one or more words or phrases by performing dependency parsing processes. A dependency parsing process may be a process whereby language processing module 132 recognizes a sentence or clause and assigns a syntactic structure to the sentence or clause. Dependency parsing may include searching for or detecting syntactic elements such as subjects, objects, predicates or other verb-based syntactic structures, common phrases, nouns, adverbs, adjectives, and the like. Such detected syntactic structures may be related to each other using a data structure and/or arrangement of data corresponding, as a non-limiting example, to a sentence diagram, parse tree, or similar representation of syntactic structure. Language processing module 132 may be configured, as part of dependency parsing, to generate a plurality of representations of syntactic structure, such as a plurality of parse trees, and select a correct representation from the plurality; this may be performed, without limitation, by use of syntactic disambiguation parsing algorithms such as, without limitation, Cocke-Kasami-Younger (CKY), Earley algorithm or Chart parsing algorithms. Disambiguation may alternatively or additionally be performed by comparison to representations of syntactic structures of similar phrases as detected using vector similarity, by reference to machine-learning algorithms and/or modules.

Still referring to FIG. 1, server 104 may include an unsupervised machine learning model 136. Unsupervised machine-learning model 136 may operate on the server and/or another computing device in communication with the server 104, which may include any hardware and/or software module. The server 104 is configured to generate, at unsupervised machine-learning model 136, at least a compatible part element as a function of the manufacturing request datum and the correlated dataset. An unsupervised machine-learning process, as used herein, is a process that derives inferences in datasets without regard to labels; as a result, an unsupervised machine-learning process may be free to discover any structure, relationship, and/or correlation provided in the data. For instance, and without limitation, unsupervised machine learning module and/or server 104 may perform an unsupervised machine learning process on a first data set, which may cluster data of first data set according to detected relationships between elements of the first data set, including without limitation correlations of elements of mechanical part data to each other and correlations of compatible part elements to each other; such relations may then be combined with supervised machine learning results to add new criteria for at supervised machine-learning processes as described in more detail below. As a non-limiting, illustrative example, an unsupervised process may determine that a first mechanical part datum correlates closely with a second mechanical part datum, where the first element has been linked via supervised learning processes to a given compatible part element, but the second has not; for instance, the second mechanical part datum may not have been defined as an input for the supervised learning process, or may pertain to a domain outside of a domain limitation for the supervised learning process. Continuing the example a close correlation between first mechanical part datum and second mechanical part datum may indicate that the second mechanical part datum is also a good predictor for the compatible part element; second mechanical part datum may be included in a new supervised process to derive a relationship or may be used as a synonym or proxy for the first mechanical part datum.

With continued reference to FIG. 1, unsupervised machine-learning model 136 may include any method of cluster analysis which outputs a hierarchy of clusters. Cluster analysis, as used herein, includes any grouping of objects such as datasets in such a way that datasets in the same group or cluster are more similar to each other than to those in other clusters. Cluster analysis may include hard clustering and/or soft clustering. Hard clustering may include clustering where each dataset belongs to any particular cluster or not. Soft clustering may include clustering where each dataset may belong to a cluster to a certain degree such as a certain percentage of belonging to any given cluster or a likelihood of belonging to a given cluster. Hierarchical clustering may group and/or segment datasets with shared attributes to extrapolate algorithmic relationships. Unsupervised machine-learning model 136 may include generating various algorithms that may work to find clusters that may be generated based on parameter settings such as distance functions to use, density threshold, and optimal of clusters to generate. Unsupervised machine-learning model 136 may include models such as but not limited to connectivity models, centroid models, distribution models, density models, subspace models, group models, graph-based models, signed graph models, neural models, and the like.

Still referring to FIG. 1, unsupervised machine-learning model 136 may include agglomerative and/or divisive hierarchical clustering. Agglomerative hierarchical clustering may include a bottom-up approach whereby each observation may start in its own cluster, and pairs of clusters may be merged as one moves up the hierarchy. Divisive hierarchical clustering may include a top-down approach whereby all observations may start in one cluster and splits may be performed recursively moving down the hierarchy.

With continued reference to FIG. 1, system 100 may include a graphic processing unit (GPU) 140 operating on the server 104. As described herein, GPU 112 may include, a device with a set of specific hardware capabilities that are intended to map well to the way that various 3D engines execute their code, including geometry setup and execution, texture mapping, memory access, and shaders. GPU 140 may include, without limitation, a specialized electronic circuit designed to rapidly manipulate and alter memory to accelerate the creation of images in a frame buffer. For instance, and without limitation, GPU 140 may include a computer chip that performs rapid mathematical calculations, primarily for the purpose of rendering images. GPU 140 may further include, without limitation, full scene anti-aliasing (FSAA) to smooth the edges of 3-D objects and anisotropic filtering (AF) to make images look crisper. GPU 140 may include, without limitation, dedicated graphics cards, integrated graphics cards, hybrid graphics cards, and/or any combination thereof. GPU 140 may be configured to calculate the volume removed by each tool of the plurality of tools for the at least a correlated compatible part element as a function of the at least an internal request datum. GPU 140 may be further configured to calculate the material removal rate of each tool of the plurality of tools for the at least a correlated compatible part element as a function of the at least an internal request datum. GPU 140 may be further configured to calculate the surface area finished by each tool of the plurality of tools for the at least a correlated compatible part element as a function of the at least an internal request datum. GPU 140 may be further configured to calculate the area removal rate for each tool of the plurality of tools for the at least a correlated compatible part element.

Continuing to refer to FIG. 1, system 100 may include a supervised machine-learning model 144 operating on the server 104. Supervised machine-learning model 144 is configured to receive a first training set 148. Receiving the first training set 148 may include receiving the first training set 148 from the unsupervised machine-learning model 136. The first training set 148 is received as a function of the at least and element of user mechanical part data and the at least a second correlated compatible part element. The first training set 148 is configured to include the correlated database. The correlated dataset may include any correlated dataset as described in detail above.

With continued reference to FIG. 1, supervised machine-learning model 144 may include, without limitation, models developed using linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Still referring to FIG. 1, supervised machine-learning algorithms may include without limitation, linear discriminant analysis. Machine-learning algorithm may include quadratic discriminate analysis, kernel ridge regression, and/or support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors' algorithms, Gaussian processes, such as Gaussian Process Regression, cross-decomposition algorithms, including partial least squares and/or canonical correlation analysis, and/or naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

With continued reference to FIG. 1, supervised machine-learning algorithms may include using alternatively or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using any training set as described herein; the trained network may then be used to apply detected relationships between elements of user input datums and antidotes.

With continuing reference to FIG. 1, training data, as used herein, is data containing correlation that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name and/or a description of a medical condition or therapy may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below.

With continued reference to FIG. 1, supervised machine-learning model 144 is further configured to generate an external price output. The external price output is generated as a function of relating the manufacturing request datum to at least a part element. The external price output, as described herein, is the industry determined price to fulfill the manufacturing request datum 108 as a function of the plurality of manufacturing request datum 108 stored in internal database 128. The external price output is described in further detail below in reference to FIG. 5.

Still referring to FIG. 1, system 100 is further designed and configured to determine a price ratio output 152. A price ratio, as described herein, is the internal cost to fulfill the manufacturing request datum 108 divided by the external price output. A price ratio output 152 is determined as a function of the external price output. Determining a price ratio output 152 further comprises generating a loss function of part specific variables and minimizing the loss function. Part specific variables, as described herein, includes any descriptive attributes of the mechanical part for manufacture. Descriptive attributes, as used herein, are any features, limitations, details, restrictions and/or specifications of the mechanical part for manufacture. Descriptive attributes may include, without limitation, any features, limitations, details, restrictions and/or specifications relating to the CNC mechanical part geometry, materials, finishes, connections, hardware, special processes, dimensions, tolerances, and the like. Descriptive attributes may further include, without limitation, any features, limitations, details, restrictions, and/or specifications relating to the total request for manufacture, such as volume of CNC mechanical parts within the manufacturing request datum 108, restrictions on deadline to have request completed, and the like. As an example and without limitation, part specific variables may include the total number of each CNC mechanical part included in the manufacturing request datum 108, such as a request to have a total number of 1,200 cooling fins manufactured. As a further example and without limitation part specific variables may include the total number of faces on the CNC mechanical part included in the manufacturing request datum 108, such as a price request to have a mechanical part with a total of 18 faces manufactured. As another example and without limitation, part specific variables may the material to which the user desired to have the CNC mechanical part of the manufacturing request datum 108 manufactured, such as a quote request for a mechanical part, or parts, manufactured out of aluminum alloy. Persons skilled in the art, upon reviewing the entirety of this disclosure, will be aware of various descriptive attributes which may be suitable for use as part specific variables consistently with this disclosure.

With continued reference to FIG. 1, system 100 may include determining a predictive close rate as a function of the price ratio output 152. Determining a predictive close rate may include evaluating the price ratio output to be above or below a determined threshold. The determined threshold, as described herein, may include a value to which the internal price exceeds the external price output and/or a value to which the internal price does not meet the external price output. As an example and without limitation, determining a predictive close rate may include evaluating the price ratio output to be below the determined threshold indicates a higher close rate. A close rate, as described herein, is the rate of the likelihood of a client and/or user opportunity, such as manufacturing request datum 108, being closed, or won, such as a user agreeing to fulfill manufacturing request datum 108. As a further example and without limitation, determining a predictive close rate may include evaluating the price ratio output to be above the determined threshold indicates a lower close rate. Persons skilled in the art, upon reviewing the entirety of this disclosure, will be aware of various means of determining a predictive close rate as a function of the price ratio output which may be suitable for use consistently with this disclosure.

Figure 2:
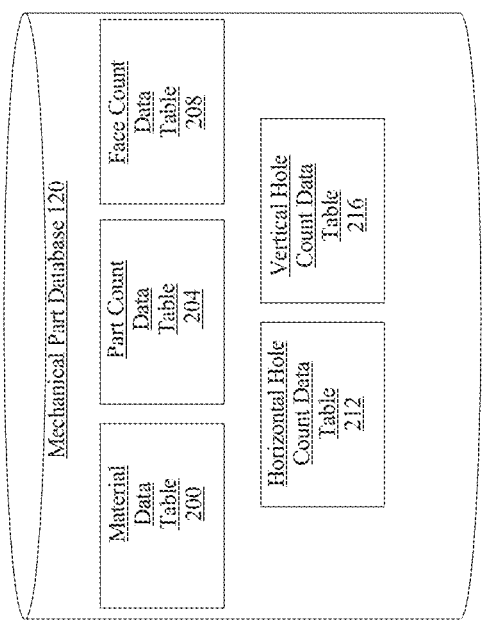
FIG. 2 illustrates a block diagram of an embodiment of a mechanical part database.

Referring now to FIG. 2, an embodiment of mechanical part database 120 is illustrated. Mechanical part database 120 may be implemented as a hardware and/or software module. Mechanical part database 120 may be implemented, without limitation, as a relational database, a key-value retrieval datastore such as a NOSQL database, or any other format or structure for use as a datastore that a person skilled in the art would recognize as suitable upon review of the entirety of this disclosure. Mechanical parts database 120 may contain datasets that may be utilized by unsupervised machine-learning model 136 to find trends, cohorts, and shared datasets between data contained within mechanical part database 120 and manufacturing request datum 108. In an embodiment, datasets contained within mechanical part database 120 may be categorized and/or organized according to shared characteristics. For instance and without limitation, one or more tables contained within mechanical part database 120 may include material data table 300. Material data table 300 may contain datasets classified to material information of user mechanical part data 116 of manufacturing request datum 108. Material information may include datasets describing metals, ASTM material standards, thermoplastics, thermosets, ceramics, graphite, biodegradable materials, medical and biochemical materials, nylons, acetals, polycarbonates, and the like. One or more tables contained within mechanical part database 120 may include part count data table 204. Part count data table 204 may include datasets classified by the total amount of parts for manufacture contained in manufacturing request datum 108. The part count may contain datasets describing total amount of parts for manufacture, for example and without limitation, by directly matching the numbers of parts for manufacture in manufacturing request datum 108, a range of numbers of parts for manufacture, a minimum and/or maximum threshold of numbers of parts for manufacture, and the like. One or more tables contained within mechanical part database 120 may include face count data table 208. Face count data table 208 may include datasets classified by the total amount of faces on the part for manufacture contained in the manufacturing request datum 108. The face count data table may contain datasets describing the total amount of faces on the part for manufacture, for example and without limitation, by directly matching the number of faces on the part for manufacture contained within manufacturing request datum 108, a range of number of faces on the part for manufacture, a minimum and/or maximum threshold of faces on the part for manufacture, and the like. One or more tables contained within mechanical part database 120 may include horizontal hole count data table 212. Horizontal hole count data table 212 may include datasets classified by the total number of horizontal holes on the part for manufacture contained in the manufacturing request datum 108. The horizontal hole count data table may contain datasets describing the total number of horizontal holes contained in the part for manufacture, for example and without limitation, by directly matching the number of horizontal holes on the part for manufacture contained in manufacturing request datum 108, a range of numbers of horizontal holes in the part for manufacture, a minimum and/or maximum threshold of numbers of horizontal holes in the part for manufacture, and the like. One or more tables contained within mechanical part database 120 may include vertical hole count data table 216. Vertical hole count data table 216 may include datasets classified by the total number of vertical holes on the part for manufacture contained in the manufacturing request datum 108. The vertical hole count data table may contain datasets describing the total number of vertical holes contained in the part for manufacture, for example and without limitation, by directly matching the number of vertical holes on the part for manufacture contained in manufacturing request datum 108, a range of numbers of vertical holes in the part for manufacture, a minimum and/or maximum threshold of numbers of vertical holes in the part for manufacture, and the like.

Figure 3:
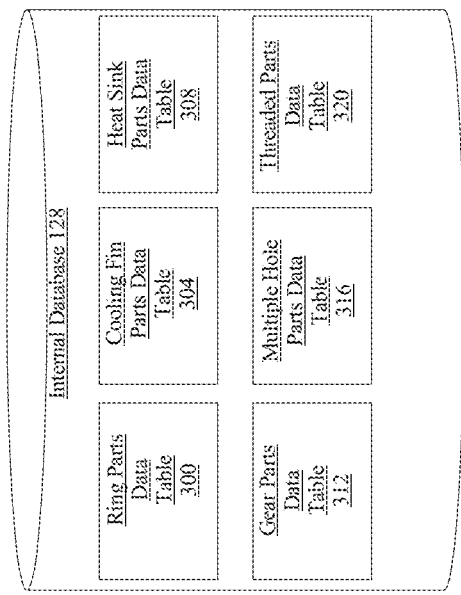
FIG. 3 is a block diagram illustrating an embodiment of an internal database.

Referring now to FIG. 3, an embodiment of internal database 128 is illustrated. Internal database 128 may be implemented as a hardware and/or software module. Internal database 128 may include any data structure for ordered storage and retrieval of data. Internal database 128 may be implemented as any database structure suitable for use as mechanical part database 120. As described in further detail above in reference to FIG. 1, internal database 128 may include stored manufacturing request datum 108. One or more tables in internal database 128 may include, as a non-limiting example, ring parts data table 300. Ring parts data table 300 may include data classified by the ring shape configuration of the part for manufacture included in manufacturing request datum 180. The ring part data table may contain data describing mechanical parts with ring shape configurations that were included in manufacturing request datum 108. One or more tables in internal database 128 may include cooling fin parts data table 304. Cooling fin parts data table 304 may include data classified by the cooling fin configuration of the part for manufacture included in manufacturing request datum 180. The cooling fin part data table may contain data describing mechanical parts with cooling fin configurations that were included in manufacturing request datum 108. Cooling fins, as described herein, are projections that increase the surface area from which heat can be radiated away from a device. The fins project outwards making the area for emitting heat internally smaller than the area emitting heat externally. One or more tables in internal database 128 may include heat sink parts data table 308. Heat sink data table 308 may include data classified by the heat sink configuration of the part for manufacture included in manufacturing request datum 180. The heat sink part data table may contain data describing mechanical parts with heat sink configurations that were included in manufacturing request datum 108. Heat sinks, as described herein, are objects that absorbs and dissipates heat from another object using thermal contact. One or more tables contained in internal database 128 may include gear parts data table 128. Gear parts data table 312 may include data classified by the gear configuration of the part for manufacture included in manufacturing request datum 180. The gear part data table may contain data describing mechanical parts with gear configurations that were included in manufacturing request datum 108. One or more data tables contained within internal database 128 may include multiple hole parts data table 316. Multiple hole parts data table 316 may include data classified by the multiple hole configuration of the part for manufacture included in manufacturing request datum 180. The multiple hole part data table may contain data describing mechanical parts with multiple hole configurations that were included in manufacturing request datum 108. One or more data tables contained within internal database 128 may include threaded parts data table 320. Threaded parts data table 320 may include data classified by the threaded configuration of the part for manufacture included in manufacturing request datum 180. The threaded part data table may contain data describing mechanical parts with threaded configurations that were included in manufacturing request datum 108. Threaded parts, as described herein, include parts containing a helical structure used to convert between rotational and linear movement or force.

Figure 4:
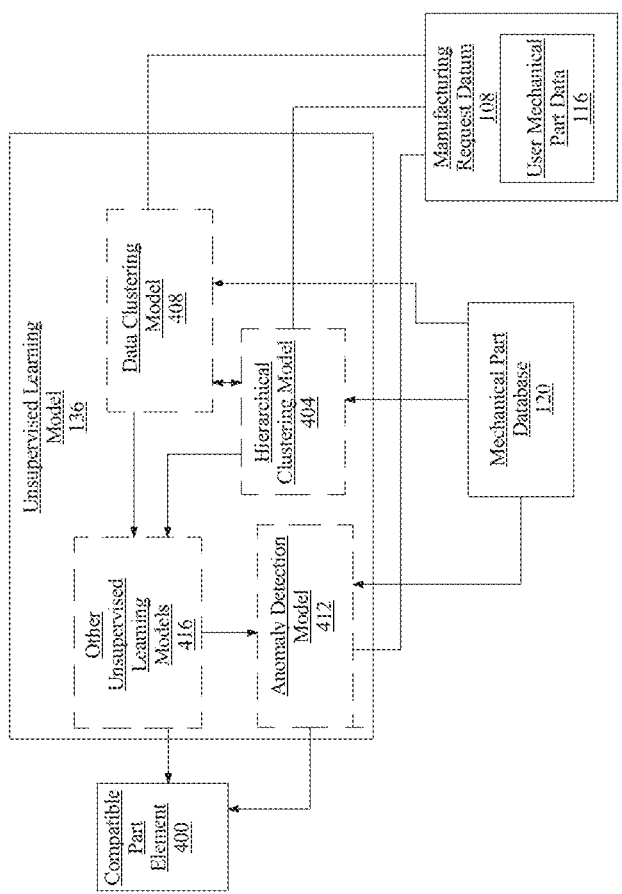
FIG. 4 is a schematic representation illustrating an embodiment of a clustering unsupervised machine-learning model.

Referring now to FIG. 4, an embodiment of unsupervised machine-learning model 136 is illustrated. Unsupervised learning may include any of the unsupervised learning processes as described herein. Unsupervised machine-learning model 136 includes any clustering unsupervised machine-learning model as described herein. Unsupervised machine-learning model 136 generates at least a second correlated compatible parts element 400. The at least a second correlated compatible parts element 400 is generated as a function of the manufacturing request datum 108 and the correlated dataset. Correlated dataset may be selected from mechanical part database 120 as described herein. Mechanical part database 120 may contain data describing different characteristics of manufacturing request datum 108, such as geometric, volume, surface area, material, number of tools required, deadline to complete request, and the like, which may be organized into categories contained within mechanical part database 120 as described above in more detail in reference to FIG. 2. Unsupervised machine-learning model may further include a hierarchical clustering model 404. Hierarchical clustering model 404 may group and/or segment datasets into hierarchy clusters including both agglomerative and divisive clusters. Agglomerative clusters may include a bottom up approach where each observation starts in its own cluster and pairs of clusters are merged as one moves up the hierarchy. Divisive clusters may include a top down approach where all observations may start in one cluster and splits are performed recursively as one moves down the hierarchy. In an embodiment, hierarchical clustering model 404 may analyze datasets obtained from mechanical part database 120 to find observations which may each initially form own cluster. Hierarchical clustering model 404 may then then identify clusters that are closest together and merge the two most similar clusters and continue until all clusters are merged together. Hierarchical clustering model 404 may output a dendrogram which may describe the hierarchical relationship between the clusters. Distance between clusters that are created may be measured using a suitable metric. Distance may be measured between for example the two most similar parts of a cluster known as single linkage, the two least similar bits of a cluster known as complete-linkage, the center of the clusters known as average-linkage or by some other criterion which may be obtained based on input received from internal database 128, as an example.

With continued reference to FIG. 4, unsupervised machine-learning model 136 may perform other unsupervised machine learning models to output at least a compatible part element 400. Unsupervised machine-learning model 136 may include a data clustering model 408. Data clustering model 408 may group and/or segment datasets with shared attributes to extrapolate algorithmic relationships. Data clustering model 408 may group data that has been labeled, classified, and/or categorized. Data clustering model 408 may identify commonalities in data and react based on the presence or absence of such commonalities. For instance and without limitation, data clustering model 408 may identify other data sets that contain the same or similar characteristics of the part for manufacture contained within manufacturing request datum 108 or identify other datasets that contain parts with similar attributes and/or differentiations. In an embodiment, data clustering model 408 may cluster data and generate labels that may be utilized as training set data. Data clustering model 408 may utilize other forms of data clustering algorithms including for example, hierarchical clustering, k-means, mixture models, OPTICS algorithm, and DBSCAN.

With continued reference to FIG. 4, unsupervised machine-learning model 136 may include an anomaly detection model 412, Anomaly detection model 412 may include identification of rare items, events or observations that differ significant from the majority of the data. Anomaly detection model 412 may function to observe and find outliers. For instance and without limitation, anomaly detect may find and examine data outliers such as a user mechanical part data 112 that is not compatible with any part elements or that is compatible with very few part elements.

Still referring to FIG. 4, unsupervised machine-learning model 136 may include other unsupervised machine-learning models 416. This may include for example, neural networks, autoencoders, deep belief nets, Hebbian learning, adversarial networks, self-organizing maps, expectation-maximization algorithm, method of moments, blind signal separation techniques, principal component analysis, independent component analysis, non-negative matrix factorization, singular value decomposition (not pictured).

Figure 5:
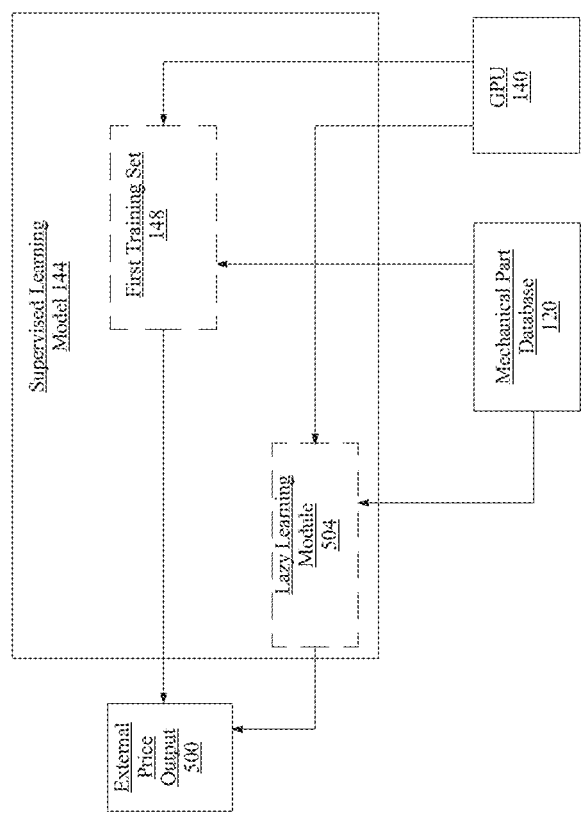
FIG. 5 is a schematic representation illustrating an embodiment of a supervised machine-learning model.

Referring now to FIG. 5, an embodiment of supervised machine learning model 144 is illustrated. Supervised machine-learning model 144 is configured to generate an external price output 500. External price output 500 is generated as a function of relating manufacturing request datum 108 to at least a part element. Supervised machine-learning model 144 generates the external price output 500 using first training set 148. Supervised machine-learning model 144 may be configured to perform any supervised machine-learning algorithm as described above in reference to FIG. 1. This may include for example, support vector machines, linear regression, logistic regression, naïve Bayes, linear discriminant analysis, decision trees, k-nearest neighbor algorithm, neural networks, and similarity learning. In an embodiment, first training set 148 may include the at least a correlated dataset. Supervised machine-learning model 144 may be further configured to calculate the external milling time as a function of relating the manufacturing request datum 108 to the material removal rate by each tool of the plurality of tools and to the area removal rate for each tool of the plurality of tools.

Continuing to refer to FIG. 5, supervised machine-learning model 144 may generate external price output 500 by executing a lazy learning module 504. Lazy learning module 504 is executed as a function of manufacturing request datum and the at least a part element. A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover a "first guess" at a mechanical part element associated with at least a manufacturing request datum, using at least a training set. As a non-limiting example, an initial heuristic may include an initial calculation of an external price output according to relation to a material data of at least a user mechanical part data, one or more categories of mechanical part data identified material data of at least a manufacturing request datum 108, and/or one or more values detected in at least a manufacturing request datum 108 sample; calculating may include, without limitation, calculating external milling time according to associations between elements of mechanical part data and compatible part elements. External milling time may be calculated using the following equation: [EQ 01]

$$T^{MKT} = \frac{V_1}{MRR_1} + \frac{V_2}{MRR_2} + \frac{V_3}{MRR_3} + \dots \frac{V_n}{MRR_n} + \frac{S_1}{ARR_1} + \frac{S_2}{ARR_2} + \frac{S_3}{ARR_3} + \dots \frac{S_n}{ARR_n}$$

where $T^{MKT}$ is the external milling time, $V_n$ is the volume removed by each tool of the plurality of tools, $MRR_n$ is the material removal rate of each tool of the plurality of tools, $S_n$ is the surface area removed by each tool of the plurality of tools, and $ARR_n$ is the area removal rate of each tool of the plurality of tools. Heuristic may include calculating external price output according to associations and/or compatible part elements. External price output may be calculated using the following equation:

$$P^{MKT} = (T^{MKT} \cdot <\text{Mill Rate}> + <\text{Material cost}> + <\text{Labor cost}> + <\text{Overhead cost}> + <\text{Rework cost}> + <\text{Operating costs}>) \cdot <\text{Mark up}> \quad [EQ\ 02]$$

where $P^{MKT}$ is the external price output, and $T^{MKT}$ is the external milling time as calculated above. Lazy learning module 504 may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate external price outputs as described in this disclosure, including without limitation lazy learning applications of machine-learning algorithms as described in further detail below.

Figure 6:
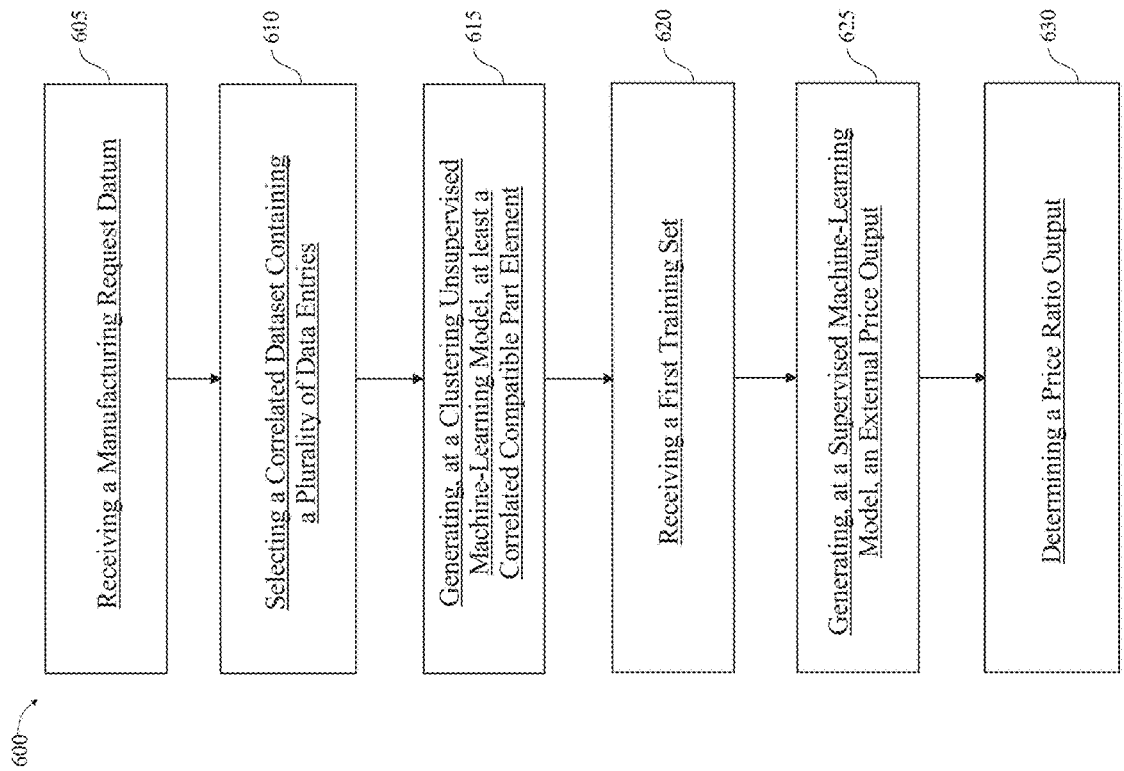
FIG. 6 is a process flow diagram illustrating an embodiment of a method for predicting a price of any subtractively manufactured part utilizing artificial intelligence at a computer device.
Figure 8B:
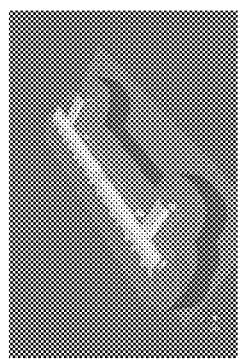
FIG. 8A-F are computer renderings of an embodiment the machined surfaces of a part for manufacture contained within manufacturing request datum.
Figure 8D:
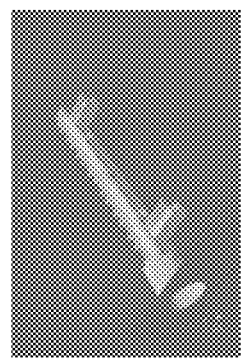
Figure 8F:
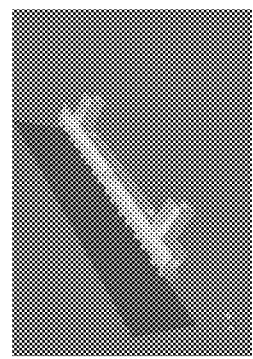
Figure 8A:
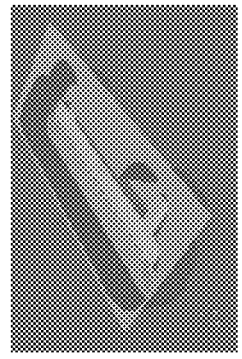
Figure 8C:
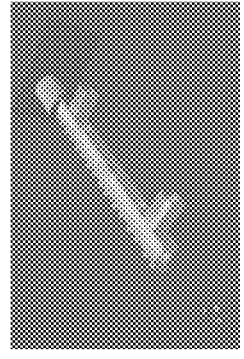
Figure 8E:
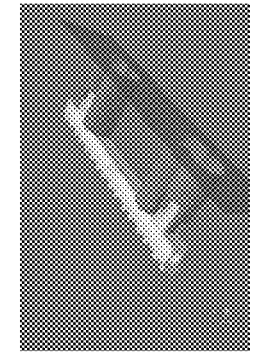

Referring now to FIG. 6, an embodiment of a method 600 for predicting a price of any CNC mechanical part utilizing artificial intelligence at a computing device is illustrated. At step 605 system 100 receives a manufacturing request datum 108 from a user client device 112. Manufacturing request datum 108 further comprises at least an element of user mechanical part data 116. Manufacturing request datum 108 may be received by system 100 utilizing any of the network methodology as described herein. Manufacturing request datum 108 may include any manufacturing request datum 108 as described herein. At least an element of user mechanical part data 116 may include any element of user mechanical part data 116 as described herein. For example and without limitation, at least an element of user mechanical part data 116 may include an element of part count data, such as a total quantity of parts for manufacture included within manufacturing request datum 108, as described above in further detail in reference to FIG. 1 As a further example and without limitation, at least an element of user mechanical part data 116 may include an element of part face count data, such as a total number of faces on the part for manufacture contained in the manufacturing request datum 108, as described in further detail above in reference to FIG. 1. As another non-limiting example, at least an element of user mechanical part data 116 may include an element of part material data, such as the material to which the part for manufacture included in manufacturing request datum 108 is to be manufactured, as described above in further detail in reference to FIG. 1.

Still referring to FIG. 6, at step 610 system 100 selects a correlated dataset containing a plurality of data entries. Each correlated dataset contains at least a datum of mechanical part data and at least a first correlated compatible part element as a function of the manufacturing request datum 108. Datasets may include any of the datasets as described herein. Datasets may be selected from mechanical part database 120. Datasets contained within mechanical part database 120 may be categorized and/or organized by any of the methodologies as described above in reference to FIG. 1 and FIG. 2. In an embodiment, at least a dataset may be selected by extracting at least a mechanical part data from manufacturing request datum 108 and matching the at least a mechanical part data to at least a correlated dataset containing at least an element of the at least a mechanical part data. At least a mechanical part data may be extracted from manufacturing request datum 108 utilizing language processing module 132 as described above in more detail in reference to FIG. 1. Mechanical part data may include any of the mechanical part data as described herein. For example, language processing module 132 may extract at least a mechanical part data such as a number of horizontal holed to be drilled in the part for manufacture contained within manufacturing datum 108 which may be utilized to match the number of horizontal holes to a dataset contained within mechanical part database 120 that contains the number of horizontal holes in the part for manufacture. In an embodiment, datasets contained within mechanical part database 120 may be organized and categorized according to mechanical part data. For example, mechanical part data relating to a mechanical part to be manufactured out of Poly(methyl methacrylate) (PMMA) extracted from manufacturing request datum 108 may be matched to a dataset contained within mechanical part database that is categorized as belonging to a category of mechanical part data such as thermoplastic mechanical parts. In yet another non-limiting example, a mechanical part relating to a flanged bolt included in manufacturing request datum 108 may be matched to a dataset contained within mechanical part database that is categorized as belonging to a category of mechanical parts such as threaded mechanical parts.

Still referring to FIG. 6, selecting a correlated dataset further comprises storing the manufacturing request datum 108 in internal database 128. At least an internal database, as described herein, includes any internal database 128, as described above in further detail in reference to FIG. 1 and FIG. 3. Datasets contained within internal database 128 may be categorized and/or organized by any of the methodologies as described above in reference to FIG. 1 and FIG. 3. Storing the manufacturing request datum 108 in internal database 128 may include any method and/or combination of methods of storing as described above in reference to FIGS. 1-5.

With continued reference to FIG. 6, at step 615 system 100 generates at least a first correlated compatible part element at clustering unsupervised machine-learning model 136. At least a first correlated compatible part element 400 is generated as a function of the manufacturing request datum 108 and the correlated dataset. Unsupervised machine-learning model 136 may include any of the unsupervised machine-learning models as described herein. Compatible part element may include any of the compatible part elements as described above in reference to FIGS. 1-5. Unsupervised machine learning module 136 may generate other unsupervised learning models including for example anomaly detection model, data clustering model, and other unsupervised learning models. In an embodiment, datasets utilized to generate unsupervised learning models, including hierarchical clustering model 404, may be obtained from mechanical part database 120 as described above in more detail in reference to FIG. 2. In an embodiment, a plurality of datasets may be selected from mechanical part database 120 and utilized to generate clustering unsupervised machine-learning model 136 as described above in more detail in reference to FIG. 2. Datasets contained within mechanical part database 120 may be obtained from internal database 128 as described above in more detail in reference to FIGS. 1-3.

Continuing to refer to FIG. 6, system 100 includes a GPU 140 designed and configured to calculate the volume removed by each tool of the plurality of tools for the at least a correlated compatible part element 400. The at least a compatible part element 400 is calculated as a function of the internal database 128. The GPU 140 includes any GPU 140 as described above in further detail in reference to FIG. 1. The volume removed may be calculated using a machining simulation for each tool of the plurality of tool for the compatible part element 400. The machining simulation, as described herein, may include, GPU 140 simultaneous rasterizing and z-buffering each side of the plurality of sides of the mechanical part for manufacture.

With continued reference to FIG. 6, GPU 140 is further designed and configured to calculate the material removal rate of each tool of the plurality of tools for the at least a correlated compatible part element 400. Compatible part element 400 is calculated as a function of the internal database 128. The internal database 128 includes any internal database 128 as described herein. The material removal rate may be calculated using the following function:

$$MRR = \langle\text{Depth of Cut}\rangle \cdot \langle\text{Width of Cut}\rangle \cdot \langle\text{Feed Rate}\rangle \qquad [\text{EQ 03}]$$

where MRR is the material removal rate of each tool of the plurality of tools for the at least a correlated compatible part element 400.

Continuing to refer to FIG. 6, GPU 140 is further designed and configured to calculate the surface area finished by each tool of the plurality of tools for the at least a correlated compatible part element 400. The at least a compatible part element 400 is calculated as a function of the internal database 128. The internal database 128 may include any internal database 128 as described herein. The surface area finished may be calculated using a machining simulation for each tool of the plurality of tool for the compatible part element 400. The machining simulation may include any machining simulation as described above.

With continued reference to FIG. 6, GPU 140 is further designed and configured to calculate the area removal rate of each tool of the plurality of tools for the at least a correlated compatible part element 400. Compatible part element 400 is calculated as a function of the internal database 128. The internal database 128 includes any internal database 128 as described herein. The area removal rate of the side wall may be calculated using the following function:

$$ARR=\langle\text{Depth of Cut}\rangle\cdot\langle\text{Feed Rate}\rangle \qquad [\text{EQ 04}]$$

where ARR is the area removal rate of the side wall of each tool of the plurality of tools for the at least a correlated compatible part element 400. The side wall, as described herein, includes a surface forming a wall, such as a vertical surface. The area removal rate of the horizontal plane is calculated using the following equation:

$$ARR=\langle\text{Width of Cut}\rangle\cdot\langle\text{Feed Rate}\rangle \qquad [\text{EQ 05}]$$

where ARR is the area removal rate of the horizontal plane of each tool of the plurality of tools for the at least a correlated compatible part element 400. The horizontal plane, as described herein, includes a surface horizontally passing through the part for manufacture. The area removal rate of inclined and curved surfaces is calculated using the following equation:

$$ARR=\langle\text{Stepover}\rangle\cdot\langle\text{Feed Rate}\rangle \qquad [\text{EQ 06}]$$

where ARR is the area removal rate of the includes or curved surface of each tool of the plurality of tools for the at least a correlated compatible part element 400 and stepover is determined by scallop height, which is the surface roughness requirement.

Continuing to refer to FIG. 6, at step 620 system 100 receives a first training set 148. The first training set 148 is received as a function of the at least an element of user mechanical part data 116 and the at least a correlated compatible part element 400. Training set may include any of the training sets and training data as described above in reference to FIGS. 1-5. In an embodiment, first training set 148 may include the correlated dataset to be utilized as first training set 148. Correlated datasets may include as correlated dataset and/or correlated data table as described above in detail in reference to FIGS. 1-5. First training set 148 may be received by categorizing manufacturing request datum 108 to contain part element and selecting at least a first training set 148 as a function of the at least a part element. User mechanical part data 116 may include any user mechanical part data 116 as described above in further detail in reference to FIG. 1. For example, user mechanical part data may indicate a number of faces of a mechanical part for manufacture included in manufacturing request datum 108.

Still referring to FIG. 6, at step 625 system 100 generates an external price output 500 at a supervised machine-learning model 144. External price output 500 is generated as a function of relating the manufacturing request datum 108 to the at least a part element. Supervised machine learning model 144 may include any of the supervised machine learning model 144 as described above in reference to FIGS. 1-5. External price output may include an external price output as described above in reference to FIG. 5. The external price output 500 may be generated by the equation as described above n further detail in reference to FIG. 5.

With continued reference to FIG. 6, generating an external price output 500 at a supervised machine-learning model 144 further comprises calculating the external milling time. The external milling time is calculated as a function of relating the manufacturing request datum 108 to the material removal rate by each tool of the plurality of tools and to the area removal rate for each tool of the plurality of tools. The external milling time is calculated using the equation as described above in reference to FIG. 5.

Still referring to FIG. 6, at step 630 system 100 determines a price ratio output 152. Determining a price ratio output 152 further comprises generating a loss function of a part specific variable and minimizing the loss function. The price ratio is the internal cost to fulfill the manufacturing request datum 108 divided by the external price output, as described above in further detail in reference to FIG. 1. Loss function may include any of the loss functions as described above in reference to FIGS. 1-5. Generating a loss function may include generating a loss function utilizing any of the methodologies as described above in reference to FIGS. 1-5. A part specific variable includes any part specific variable as described above in further detail in reference to FIG. 1. For example, system 100 may generate a loss function utilizing part specific variables that include any features, limitations, details, restrictions and/or specifications relating to the CNC mechanical part geometry, materials, finishes, connections, hardware, special processes, dimensions, tolerances, and the like. Minimizing a loss function may be done utilizing any of the methodologies as described above in reference to FIGS. 1-15. Loss function analysis algorithms may iterate to gradually converge towards a minimum where further tweaks to the parameters produce little or zero changes in the loss or convergence by optimizing weights utilized by machine learning algorithms.

Referring now to FIGS. 7A-F, an embodiment of the first stage of machining simulation at GPU 140 is illustrated. The first stage of machining simulation, as described above in reference to FIG. 6, includes GPU 140 simultaneously rasterizing and z-buffers each side of the plurality of sides of the part for manufacture included in the manufacturing request datum 108. FIGS. 7A-F displays the 3D rendering of the z-buffers for a mechanical part contained within manufacturing request datum 108 with six sides. Each side of the six sides are displayed in each figure of FIGS. 7A-F.

Referring now to FIGS. 8A-F, an embodiment of the second stage of machining simulation at GPU 140 is illustrated. The second stage of machining simulation, as described above in reference to FIG. 6, includes GPU 140 simulating the machining of each surface of the plurality of surfaces for the mechanical part for manufacture using each tool of the plurality of tools necessary to machine the part for manufacture contained within manufacturing request datum 108. FIGS. 8A-F displays the 3D rendering of each simulated machined surface of the plurality of machined surfaces for a part for manufacture contained within manufacturing request datum 108 with six sides. Each side of the six sides are displayed in each figure of FIGS. 8A-F.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
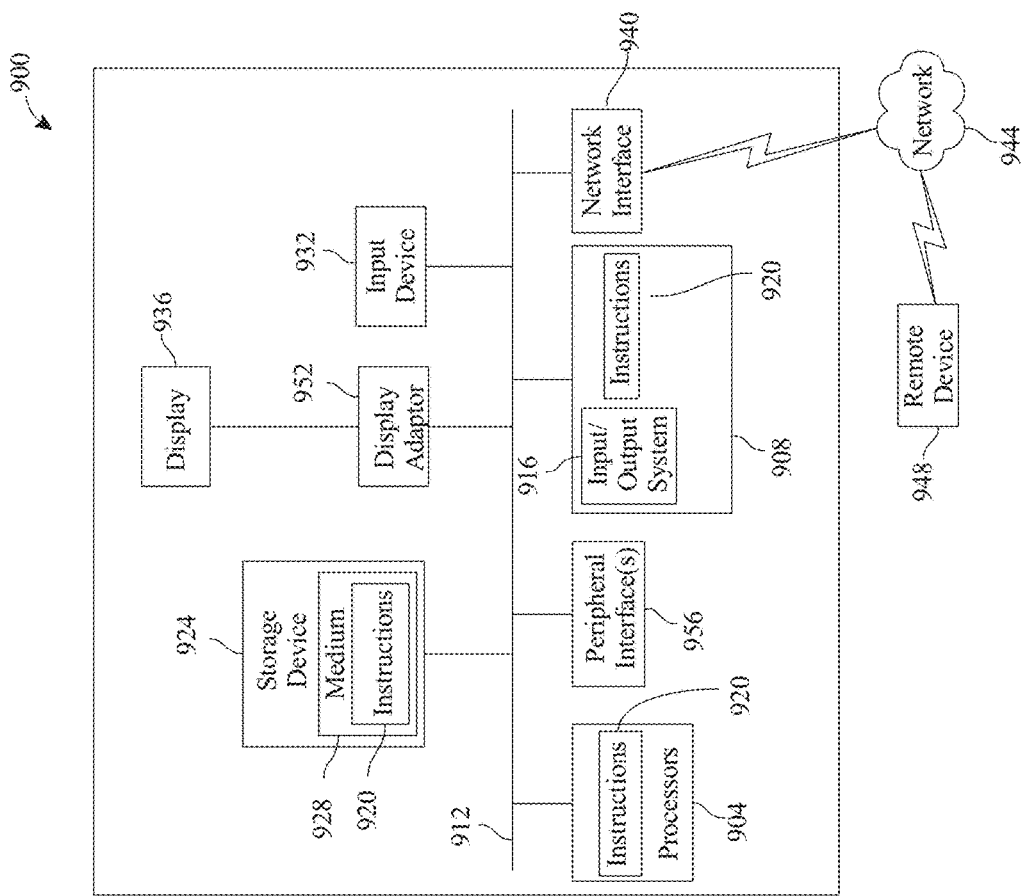
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 9900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method for predicting a price of any subtractively manufactured part utilizing artificial intelligence at a computing device, the method of predicting a price comprising:
    receiving, by a computing device, a manufacturing request datum, wherein the manufacturing request datum further comprises at least an element of user mechanical part data;
    parsing, by a language processing module, the manufacturing request datum for the at least an element of user mechanical part data by performing a dependency parsing process;
    selecting, by the computing device, a correlated dataset containing a plurality of data entries wherein each dataset contains at least a datum of mechanical part data and at least a first correlated compatible part element as a function of the manufacturing request datum;
    generating, at a clustering unsupervised machine-learning model operating on the computing device, at least a second correlated compatible part element as a function of the manufacturing request datum and the correlated dataset, wherein the unsupervised machine-learning model includes an anomaly detection model, wherein the anomaly detection model detects and examines data outliers in the mechanical part data;
    receiving, at a supervised machine-learning model operating on the computing device, a first training set as a function of the at least an element of user mechanical part data and the at least a second correlated compatible part element;
    training the supervised machine-learning model as a function of the first training set to generate a trained supervised machine-learning model, wherein a correlation between the at least a first correlated compatible part element and the at least a second correlated compatible part element is combined with a result of the training of the supervised machine-learning model to add new criteria for a new supervised process to derive a relationship;
    generating, at the trained supervised machine-learning model as a function of the first training set operating on the computing device, an external price output as a function of relating the manufacturing request datum to at least a part element, wherein the at least a part datum is provided to the trained supervised machine-learning model as an input to output the external price output;
    determining a price ratio output, by the computing device, as a function of the external price output, wherein determining the price ratio output further comprises:
        generating a loss function of a part specific variable; and
        minimizing the loss function.

2. The method of claim 1, wherein the at least an element of user mechanical part data further comprises at least one of:
    an element of part count data;
    an element of part face count data; and
    an element of part material data.

3. The method of claim 1, wherein receiving a manufacturing request datum further comprises:
    storing the manufacturing request datum in an internal database.

4. The method of claim 1, wherein the method of predicting a price further comprises:
    calculating, by a graphic processing unit, the volume removed by each tool of the plurality of tools for the at least a correlated compatible part element as a function of an internal database.

5. The method of claim 1, wherein the method of predicting a price further comprises:
    calculating, by a graphic processing unit, the material removal rate of each tool of the plurality of tools for the at least a correlated compatible part element as a function of an internal database.

6. The method of claim 1, wherein the method of predicting a price further comprises:
    calculating, by a graphic processing unit, the surface area finished by each tool of the plurality of tools for the at least a correlated compatible part element as a function of an internal database.

7. The method of claim 1, wherein the method of predicting a price further comprises:
calculating, by a graphic processing unit, the area removal rate for each tool of the plurality of tools for the at least a correlated compatible part element as a function of an internal database.

8. The method of claim 1, wherein the first training set further comprises the correlated dataset.

9. The method of claim 1, wherein generating an external price output further comprises:
calculating the external milling time as a function of relating the manufacturing request datum to the material removal rate by each tool of the plurality of tools and to the area removal rate for each tool of the plurality of tools.

10. The method of claim 1, wherein the part specific variable further comprises at least one of:
an element of tool selection datum;
an element of cutting parameter datum; and
an element of tool path strategy datum.

11. A system for predicting a price of any subtractively manufactured part utilizing artificial intelligence at a computer device, the system comprising:
at least a processor;
a memory communicatively connected to the at least a processor, wherein the memory contains instructions configuring the at least a processor to:
receive a manufacturing request datum, wherein the manufacturing request datum further comprises at least an element of user mechanical part data;
parse the manufacturing request datum for the at least an element of user mechanical part data using a language processing module, wherein parsing the manufacturing request datum further comprises performing a dependency parsing process;
select a correlated dataset containing a plurality of data entries wherein each dataset contains at least a datum of mechanical part data and at least a first correlated compatible part element as a function of the at least a manufacturing request datum;
generate, at a clustering unsupervised machine-learning model, at least a second compatible part element as a function of the manufacturing request datum and the correlated dataset, wherein the unsupervised machine-learning model includes an anomaly detection model, wherein the anomaly detection model detects and examines data outliers in the mechanical part data; and
receive, at a supervised machine-learning model, a first training set as a function of the at least an element of user mechanical part data and the at least a second correlated compatible part element;
train the supervised machine-learning model as a function of the first training set to generate a trained supervised machine-learning model, wherein a correlation between the at least a first correlated compatible part element and the at least a second correlated compatible part element is combined with a result of the training of the supervised machine-learning model to add new criteria for a new supervised process to derive a relationship;
generate, at the trained supervised machine-learning model, an external price output as a function of relating the manufacturing request datum to at least a part element, wherein the at least a part datum is provided to the trained supervised machine-learning model as an input to output the external price output; and
determining a price ratio output, wherein determining the price ratio output further comprises:
generating a loss function of a part specific variable; and
minimizing the loss function.

12. The system of claim 11, wherein the at least an element of user mechanical part data further comprises at least one of:
an element of part count data;
an element of part face count data; and
an element of part material data.

13. The system of claim 11, wherein the computing device is further configured to:
store the manufacturing request datum in an internal database.

14. The system of claim 11, wherein the computing device is further configured to:
calculate the volume removed by each tool of the plurality of tools for the at least a correlated compatible part element as a function of the at least an internal request datum.

15. The system of claim 11, wherein the computing device is further configured to:
calculate the material removal rate of each tool of the plurality of tools for the at least a correlated compatible part element as a function of an internal database.

16. The system of claim 11, wherein the computing device is further configured to:
calculate the surface area finished by each tool of the plurality of tools for the at least a correlated compatible part element as a function of an internal database.

17. The system of claim 11, wherein the computing device is further configured to:
calculate the area removal rate for each tool of the plurality of tools for the at least a correlated compatible part element as a function of an internal database.

18. The system of claim 11, wherein the first training set further comprises the correlated dataset.

19. The system of claim 11, wherein generating an external price output further comprises:
calculating the external milling time as a function of relating the manufacturing request datum to the material removal rate by each tool of the plurality of tools and to the area removal rate for each tool of the plurality of tools.

20. The system of claim 11, wherein the part specific variable further comprises at least one of:
an element of tool selection datum;
an element of cutting parameter datum; and
an element of tool path strategy datum.

* * * * *